(12) United States Patent
Ramamurthy et al.

(10) Patent No.: US 8,856,229 B2
(45) Date of Patent: Oct. 7, 2014

(54) SYSTEM AND METHOD FOR SOCIAL NETWORKING

(75) Inventors: Shyam Sundar Ramamurthy, Bangalore (IN); Manish Satyapal Gupta, Bangalore (IN); Himanshu Verma, Bangalore (IN); Shyam Krishnamurthy, Bangalore (IN); Srinivas Devarakonda, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 1037 days.

(21) Appl. No.: 12/693,510

(22) Filed: Jan. 26, 2010

(65) Prior Publication Data

US 2011/0185020 A1   Jul. 28, 2011

(51) Int. Cl.
*G06F 15/16* (2006.01)

(52) U.S. Cl.
USPC .......................................................... 709/204

(58) Field of Classification Search
CPC .. G06Q 30/02; G06Q 50/01; G06F 17/30867; H04L 51/32; H04L 12/588
See application file for complete search history.

(56) References Cited

U.S. PATENT DOCUMENTS

| | | | |
|---|---|---|---|
| 7,630,972 B2 | 12/2009 | Ott, IV et al. | |
| 7,699,338 B2 | 4/2010 | Dargavell et al. | |
| 7,756,903 B2 | 7/2010 | Kumar | |
| 2005/0159970 A1* | 7/2005 | Buyukkokten et al. | 705/1 |
| 2005/0171799 A1* | 8/2005 | Hull et al. | 705/1 |
| 2005/0177385 A1* | 8/2005 | Hull et al. | 705/1 |
| 2005/0216550 A1* | 9/2005 | Paseman et al. | 709/202 |
| 2008/0023944 A1 | 1/2008 | Dargavell et al. | |
| 2008/0140806 A1 | 6/2008 | Kumar | |
| 2008/0168052 A1* | 7/2008 | Ott et al. | 707/5 |
| 2008/0172458 A1* | 7/2008 | Middleton et al. | 709/203 |
| 2008/0189122 A1* | 8/2008 | Coletrane et al. | 705/1 |
| 2009/0043844 A1* | 2/2009 | Zimmet et al. | 709/204 |
| 2009/0063284 A1* | 3/2009 | Turpin et al. | 705/14 |
| 2009/0177744 A1 | 7/2009 | Marlow et al. | |
| 2009/0197681 A1* | 8/2009 | Krishnamoorthy et al. | 463/42 |
| 2009/0222488 A1 | 9/2009 | Boerries et al. | |
| 2009/0222716 A1 | 9/2009 | Boerries et al. | |

(Continued)

FOREIGN PATENT DOCUMENTS

| | | |
|---|---|---|
| AU | 2007342252 | 7/2008 |
| CA | 2710653 | 8/2009 |

(Continued)

OTHER PUBLICATIONS

International Search Report and Written Opinion from International Appln. No. PCT/US2011/022616 mailed Sep. 27, 2011.

*Primary Examiner* — Peling Shaw
(74) *Attorney, Agent, or Firm* — James J. DeCarlo; Greenberg Traurig, LLP

(57) ABSTRACT

Methods, systems and computer program products are provided for social networking. In one method, a network builder receives a digital object from the user. The digital object contains information associated with the user. The network builder extracts the information associated with the user from the digital object. The network builder further access the strength of relationships between the user and a plurality of other users, each associated with one or more social networks. The relationships strength is extracted based at least in part on the extracted information. The network builder then adds the user to one or more social networks based on the information associated with the user and the strength of the relationships between the user and the plurality of other users.

19 Claims, 7 Drawing Sheets

(56) References Cited

U.S. PATENT DOCUMENTS

| | | |
|---|---|---|
| 2009/0234814 A1 | 9/2009 | Boerries et al. |
| 2009/0234815 A1 | 9/2009 | Boerries et al. |
| 2009/0240564 A1 | 9/2009 | Boerries et al. |
| 2009/0249451 A1 | 10/2009 | Su et al. |
| 2009/0327427 A1* | 12/2009 | Mathew et al. ............... 709/206 |
| 2010/0082618 A1 | 4/2010 | Ott, IV et al. |

FOREIGN PATENT DOCUMENTS

| | | |
|---|---|---|
| CN | 101583949 | 11/2009 |
| CN | 101911066 | 12/2010 |
| CN | 101933038 | 12/2010 |
| CN | 101960447 | 1/2011 |
| CN | 10191570 | 2/2011 |
| CN | 101981590 | 2/2011 |
| EP | 2118778 | 11/2009 |
| EP | 2238570 | 10/2010 |
| EP | 2272015 | 1/2011 |
| JP | 2011-511981 | 4/2011 |
| KR | 10-2009-0100435 | 9/2009 |
| KR | 10-2010-0107495 | 10/2010 |
| KR | 10-2010-0118975 | 11/2010 |
| KR | 10-2010-0123893 | 11/2010 |
| KR | 10-2011-0000686 | 1/2011 |
| KR | 10-2011-0002063 | 1/2011 |
| MX | 2010007847 | 8/2010 |
| TW | 200949566 | 12/2009 |
| TW | 200951734 | 12/2009 |
| WO | 2008-085637 | 7/2008 |
| WO | 2009-088671 | 7/2009 |
| WO | 2009-099496 | 8/2009 |
| WO | 2009-111226 | 9/2009 |
| WO | 2009-145812 | 12/2009 |
| WO | 2009-146087 | 12/2009 |

* cited by examiner

| Personal Information | |
|---|---|
| Name | James Kay |
| Address | 103, Bella Vista Apt., 66 Street |
| City | Austin |
| Zipcode | 73701 |
| Email | james.kay@yahoo.com |
| Education | |
| Graduation School | Texas A&M University |
| Graduation year | Sept. 2000 to Apr. 2003 |
| Major | Computer Software Engineering |
| Degree | Master |
| Graduation School | School of ABC |
| Graduation year | Sept. 1996 to July 2000 |
| Major | Computer Science and Technology |
| Degree | Bachelors |
| Experience | |
| Project | Human Face Recognition System |
| Company/University | XYZ Company of America |
| Duration | March 2003 to now |
| Project | Content Based Image Retrieval System |
| Company/University | Research Center of XYZ Company |
| Duration | June 2001 to March 2003 |
| Project | Highway Distress Detection System |
| Company/University | Texas A&M University. |
| Duration | Sept. 2000 to May 2001 |
| Interests | |
| | Reading |
| | Photography |
| | Music |

*FIG. 4B*  400B

SYSTEM AND METHOD FOR SOCIAL NETWORKING

TECHNICAL FIELD

The present disclosure generally relates to online social networking for users.

BACKGROUND

Online social networking is a popular means of connecting people who share similar interests, industrial skills, academic background and the like. Online social networking provides users the opportunity to interact with other users without being restricted by geographic and time-zone boundaries. Further, users are able to customize their profiles by becoming part of groups and communities within the social networking service and communicate with each other using e-mail, instant messages, forums and the like, provided by the social networking service.

Users register with online social networking services and fill out web forms to provide information such as their name, gender, email address, area of residence, interests and hobbies, work experience, educational background, photographs and so forth. Once registered, the users may then form their own social network and customize their profiles by establishing relationships with other users, joining communities, posting content and posting their views and comments on posted content.

However, filling personal details in web forms during registration is a cumbersome activity. With a multitude of social networking services, providing personal details while registering for each of the social networking services also proves to be repetitive and cumbersome. This problem is compounded by the limited importability of information from one online social networking service to another.

Further, the task of building one's social network is a slow and time consuming process that requires inputs and efforts from the user. Moreover to build one's social network involves identifying potential contacts, communicating with the potential contacts, forming relationships with the potential contacts, identifying communities of interest and joining these communities. Also, due to limited importability of information from one social networking service to another, forming relationships with users already related on other social networking sites is a repetitive and laborious task.

Still further, online social networking services do not provide convenient methods to entities searching for and contacting people who are potential candidates for purposes such as volunteering at events, creating a subject set for researches and studies, forming focus groups, targeting relevant users for advertisements and so forth. Also, there is no mechanism to target groups of people rather than individuals for the above mentioned purposes. Current online social networking services require such entities to manually search, screen and contact the individual members of the social network.

SUMMARY

In particular embodiments, the present invention provides methods, systems and computer program products for social networking. In one method, a social networking system receives a digital object from the user. The digital object contains information associated with the user. The social networking system extracts the information associated with the user from the digital object. Further, the social networking system assesses the strength of the relationship of the user and a plurality of other users based on the extracted information of the user. The social networking system then adds the user to one or more social networks considering the information associated with the user and the strength of the relationships between the user and the plurality of other users.

BRIEF DESCRIPTION OF THE DRAWINGS

FIG. 4B illustrates example information associated with a user, extracted from a digital object according to one embodiment;

DETAILED DESCRIPTION

Various embodiments of the present invention will be described in detail below with reference to accompanying drawings. It will be apparent, however, that these embodiments may be practiced without some or all of these specific details. In other instances, well known process steps or elements have not been described in detail in order not to unnecessarily obscure the description of the invention. The following example embodiments and their aspects are described and illustrated in conjunction with apparatuses, methods, and systems which are meant to be illustrative examples, not limiting in scope.

Particular embodiments of the present invention provide systems and methods that facilitate online social networking. A network builder receives a digital object that contains information associated with a user. The network builder extracts the information associated with the user (referred to herein as user information) and subsequently adds the user to one or more social networks based on the extracted information.

Example Network Environment

Figure 1:
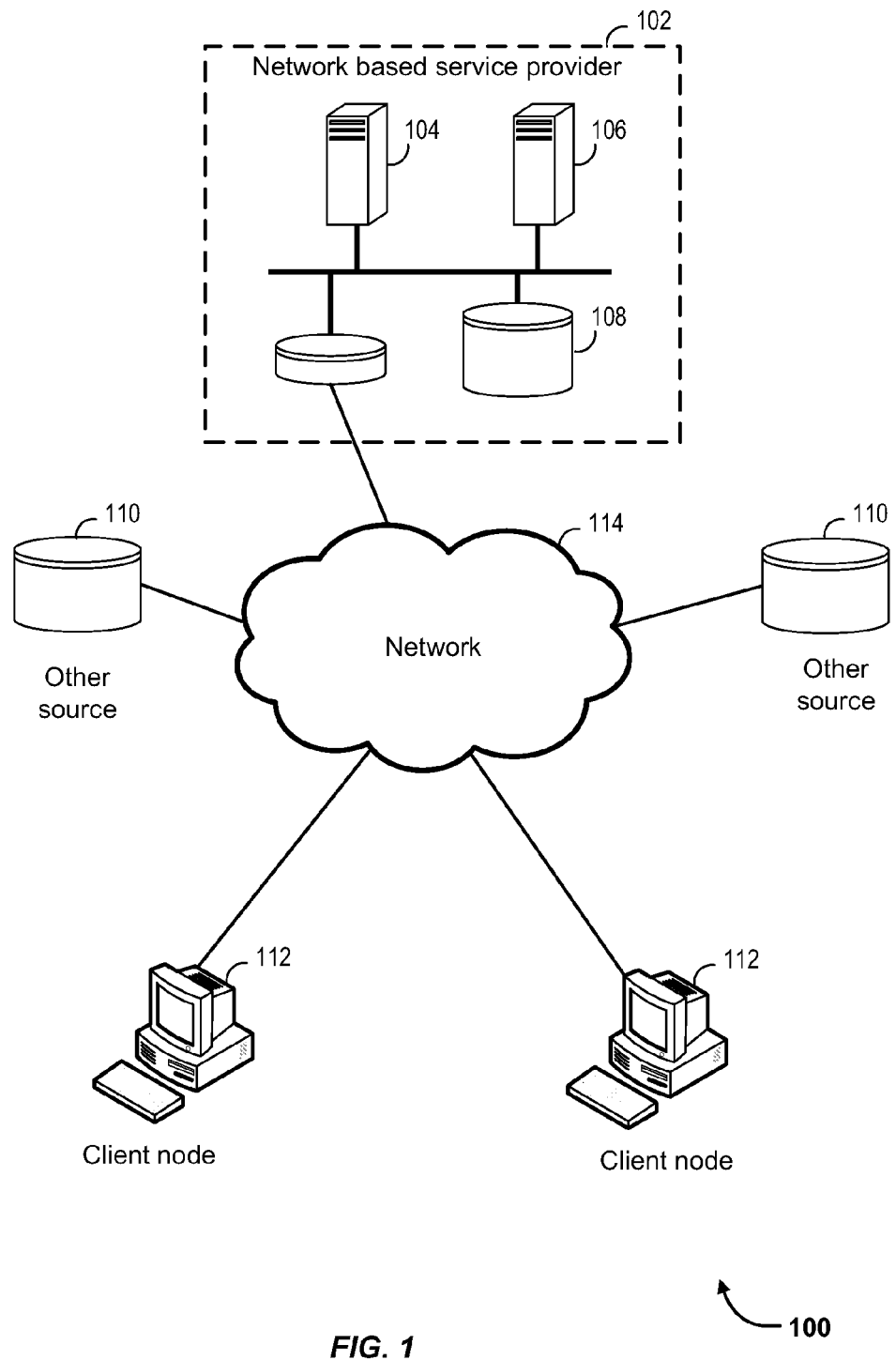
FIG. 1 illustrates an example network environment in which particular implementations may operate.

FIG. 1 illustrates an implementation of a network environment 100 in which particular implementations of the invention may be deployed according to one embodiment. Network environment 100 includes network based service provider 102, one or more other sources 110, one or more client nodes 112 and a network 114. Network based service provider 102 includes one or more application servers 104, a network builder 106, and a user information database 108. Network 114 generally represents one or more interconnected networks, over which network based service provider 102, other sources 110, and client nodes 112 can communicate with each other. Network 114 may include packet-based wide area networks (such as the Internet), local area networks (LAN), private networks, wireless networks, satellite networks, cellular networks, paging networks, and the like. A person skilled in the art will recognize that network 114 may also be a combination of more than one type of network. For example, network 114 may be a combination of a LAN and the Internet. In addition, network 114 may be implemented as a wired network, or a wireless network or a combination thereof. Client nodes 112 are communicatively coupled to network 114 via a network service provider or any other suitable methods known in the art.

Network Based Service Provider

Network based service provider 102 is a network addressable system that hosts a social networking service accessible over network 114 to one or more users using client nodes 112. In an embodiment, the social networking service is a career or business networking service that may connect the user with professionals from different businesses.

Application servers 104 may provide social networking service access to client nodes 112 after registration and authentication at a registration and authentication server (not shown in FIG. 1). The application servers host web pages and applications implemented using Common Gateway Interface script (CGI), PHP Hyper-text Processor (PHP), Active Server Pages (ASP), Hyper Text Markup Language (HTML), Extensible Markup Language (XML), Java and the like. The registration and authentication server facilitates registration of new users to the social networking service, and authenticates existing users at sign-in. In some embodiments, the registration and authentication server uses security protocols such as Secure Sockets Layer (SSL), Transport Layer Security (TLS) or GnuTLS.

Subsequent to registration, the user provides user information to the social networking service. In an embodiment, the user may upload a digital object through an application provided by network based service provider 102. The digital object may contain user information, such as, but not limited to, personal information, educational qualification, and the like. The digital object may be, without limitation, a word processor document, a Portable Document Format (PDF) file, a text file, a Hyper-Text Markup Language (HTML) file, a Tagged Image File Format (TIFF) image or a Portable Network Graphics (PNG) image or any other kind of a digital file. Further, the digital object may be, without limitation, an electronic version of the user's resume, the user's academic transcripts, the user's discography, the user's filmography and the like.

The structure in which the information is contained in the digital object is based on the style of different users. Thus, there is no common format for associating information in the digitals file. However, for analyzing the information associated with one user with another user, the information is generally extracted from the digital objects. In other words, the unstructured format of the information contained in the digital object is converted in a structured format upon extraction.

Network builder 106 extracts the user information from the digital object. In one embodiment, network builder 106 employs machine learning algorithms for extracting the user information from the digital object. The machine learning algorithms are required since the information contained in the digital object does not follow a standard format or structure. For example applicant information in a resume may contain applicant experience and education in a chronological order, or reverse chronological order. Machine learning is a scientific discipline concerned with the design and development of algorithms that allow computers to learn based on data, such as from sensor data or databases. Machine learning algorithms automatically learn to recognize complex patterns and make intelligent decisions based on the data. The use of machine learning algorithms automates the task of extracting information from the digital object. The network builder stores the extracted information in user information database 108. User information database 108 may be implemented using any known database solution such as a Relational Database Management System (RDBMS), an Extensible Markup Language (XML) database, a flat file database, and the like.

In another embodiment, the user may provide the information in a web form hosted on application server 104. The information provided in the web-form may follow a common format. Application server 104 then provides the information to network builder 106. Since, the information is in a structured format, network builder 106 does not necessarily employ the machine learning algorithm. Application server 104 also saves the information in user information database 108.

Network builder 106 may also obtain additional information from other sources 110. The additional information may include, without limitation, user profile information from other services, user behavior information, and the like; or general information such as, without limitation, popularity of a certain educational institution, or average wages in a given geographic area, and the like. In an embodiment, network based service provider 102 implements a widget to obtain additional information about the user. The user may activate the widget and authorize network based service provider 102 to obtain additional information about the user from other sources 110. Network builder 106 stores the additional information in user information database 108.

Subsequently, network builder 106 assesses the strength of relationships between the user and a plurality of other users, based on the extracted information of the user. In an embodiment, each of the plurality of other users may be associated with one or more existing social networks. A social network is a cluster of users, who share one or more common attributes. Network builder 106 identifies the common attributes between the users from the extracted information. One or more common attributes may include, but not limited to, users residing in the same locality, users seeking similar jobs, users in the same age group, users expecting similar salaries, users who have worked in the same company, users who have graduated from the same school, users having the same field of specialization, users having complementary fields of specialization, users who have similar skills, and the like. Network builder 106 may establish the relationships of users with each other or add the users to one or more social networks based on the identified common attributes between users. Thus, network builder 106 either adds the user to one or more existing social networks or create one or more new social networks based on the user information and the strength of relationships between the user and the plurality of other users.

The social networking service provides means for interaction between different users using conventional modes for interaction known in the art, such as, instant messaging, offline messaging, e-mails and forums, and the like. Apart from the traditional use of the social networking service as set forth above, advertisers, recruiters and other such entities may utilize the social networks and social networks to target groups of users for delivering relevant content and advertisements.

Other Sources

Other sources 110 are publicly available sources, or online services, which may store additional information. The additional information may include, but not limited to, statistical or demographic information. The additional information may include, information associated with various organizations and industries, stocks, economy conditions and the like. Exemplary publicly available other sources 110 include, without limitation, United States Bureau of Labor Statistics, and PayScale Inc. for obtaining statistical data of wages, employee benefits, and employment costs in different geographic regions, different industries and different positions in an industry; educational institution rankings such as those provided by U.S. News and World Report; and top employer rankings such as those provided by Fortune magazine and Forbes magazine. Exemplary online services include social networking websites such as LinkedIn®, for obtaining references, special skills, and career objectives of the user (using the user's profile information); and online finance websites such as Yahoo! Finance® for obtaining insights on the user's interest in his future professional career and academic pursuits (using page viewing statistics). In various embodiments, the users needs to authorize network based service provider 102 to obtain additional information from online services included in other sources 110.

Client Nodes

Client node 112 is a computing device from which a user accesses the services provided by the network based service provider 102. Client node 112 has the capability to communicate over network 114. Client node 112 further has the capability to provide the user an interface to interact with the service provided by network based service provider 102. Client node 112 may be, for example, a desktop computer, a laptop computer, a mobile phone, a personal digital assistant, and the like. A client node may execute one or more client applications such as, without limitation, a web browser to access and view content over a computer network, an email client to send and retrieve emails, an instant messaging client for communicating with other users, and a File Transfer Protocol (FTP) client for file transfer. Client nodes 112, in various embodiments, may include a Wireless Application Protocol (WAP) browser or other wireless or mobile device protocol suites such as, without limitation, NTT DoCoMo's i-mode wireless network service protocol suites, EDGE, and the like.

Although FIG. 1 illustrates the foregoing systems as separate systems, the functionality represented by each system may be combined into other systems. Furthermore, the functionality represented by each depicted system may be further separated. Still further, implementations of the present invention may operate in network environments that include multiples of one or more of the individual systems and sites disclosed herein. In addition, other implementations may operate in network environments where one or more of the systems described herein have been omitted.

Network Builder

Figure 2:
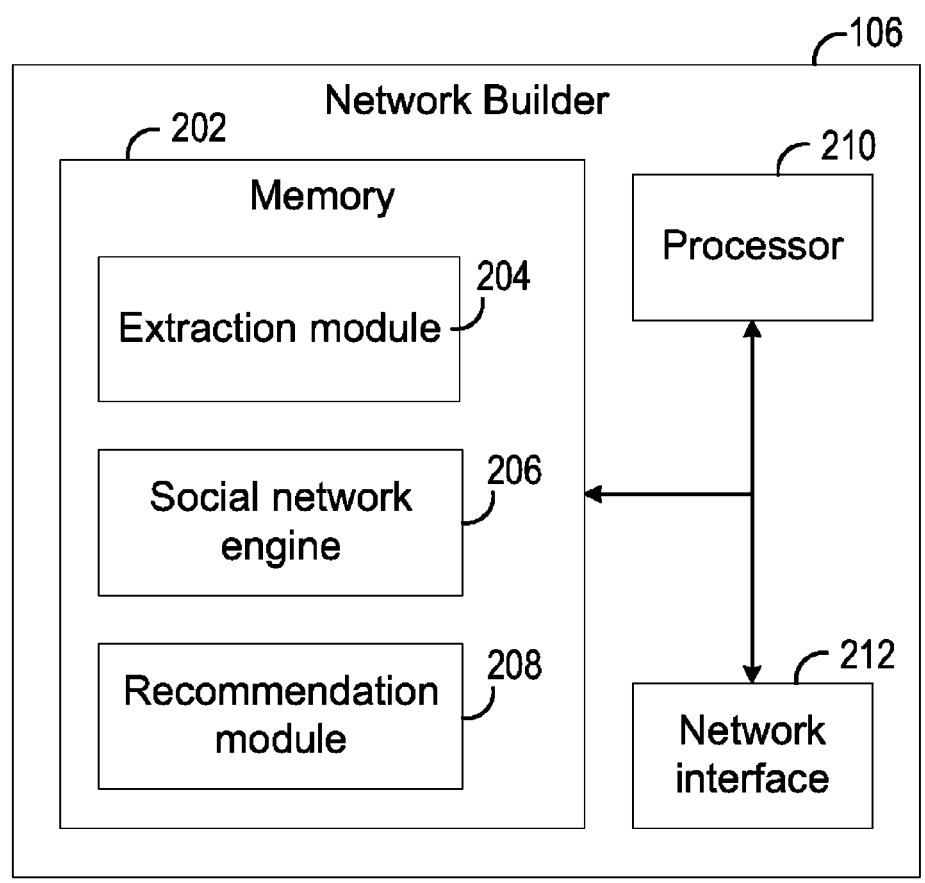
FIG. 2 illustrates an example system for forming a social network according to one embodiment.

FIG. 2 is a simplified block diagram of network builder 106 in accordance with one embodiment. Network builder 106 includes a memory 202 that further includes an extraction module 204, and a social network engine 206. In an embodiment, memory 202 may also include a recommendation module 208. In various embodiments, network builder 106 further includes one or more processors 210 and a network interface 212.

In an embodiment of the invention, network builder 106 receives a digital object. The digital object includes user information. The user information may depend upon the purpose of the digital object. For example, in case of a resume as a digital object, the user information may include, but not limited to, name, contact details, education qualifications, professional experience, hobbies and the like. Further, the structure in which the information is contained in the digital object is based on the style of different users. Moreover, there is no common format for associating information in the digitals file.

Thus, the digital object may be in an unstructured format or a structured format. The unstructured format refers to the digital object uploaded by the user. The unstructured digital object may be received as a text file, a word processor document, a portable document or a scanned image. The structured format refers to the information filled by the user on a webform provided by network based service provider 102. However, for analyzing the information associated with one user with another user, the information is generally extracted from the digital objects.

In an embodiment of the invention, extraction module 204 employs machine learning algorithms in a two-phase approach to extract the information from the digital object, which is received in an unstructured format.

In the first phase of the two-phase approach, extraction module 204 identifies a plurality of information segments in the digital object. Subsequently, extraction module 204 tags the information segments with segment labels. For example, in processing a resume of a user, extraction module 204 identifies personal information, educational qualification, work experience, skills, objectives, hobbies and interests and references sections in the resume of the user. In an embodiment, extraction module 204 identifies the plurality of information segments based on the headings and sub-headings in the digital object. Extraction module 204 may tag the information segments with predefined standard segment labels. The use of standard segment labels aids indexing and searching of the user information.

In the second phase of the two-phase approach where extraction module 204 extracts one or more information fields from the identified information segments. For example, in processing a resume of a user, extraction module 204 may extract name, residential address, phone number, age, gender and languages known from the personal information segment of the resume; graduation school name, degree, and field of specialization from the educational qualification segment of the resume; past and current employer details from the work experience segment of the resume and so forth.

In various embodiments, extraction module 204 may employ discriminative probabilistic models such as Conditional Random Fields (CRF) to parse the information contained in the digital object. CRF are undirected graphical models used to calculate the conditional probability of values $(Y_i)$ on designated output nodes given values $(X_i)$ assigned to other designated input nodes. The input nodes contain the observed input values $(X_i)$, such as the words in the digital object. The output nodes represent labels for elements in the input sequence (X). In an embodiment, the output nodes are connecting in a linear chain.

The conditional dependency of the output value (Yi) on the input sequence (X) at each position (i) in the input sequence is defined by feature functions in the form:

$$f(Y_{i-1}, Y_i, X, i)$$

The feature function returns the likelihood that the label sequence $Y_{i-1}, Y_i$ matches the output value $X_i$ at position i of the input sequence X. For example, in processing a resume, the feature function 'for' may return the value 1 (indicating certain match) for the label sequence "Residence" $(Y_{i-1})$, "Country" $(Y_i)$ when the word $(X_i)$ at position i in the resume (X) is a word appearing in the list of country names, and may return the value 0 otherwise. Feature functions provide powerful means to determine characteristics about the input sequence, such as, but not limited to, determining previous words, next words, combinations of words, and the like.

Further, the CRF model assigns each feature function a weight and combines them to determine probability of a particular value of $Y_i$. The training step for the CRFs determines a weight for each feature function. The weight of the feature function may be found using numerical optimization techniques known in the art including, without limitation, gradient descent algorithms and Quasi-Newton method, such as the L-BFGS algorithm.

The use of CRF allows efficient algorithms for learning the conditional distributions between $Y_i$ and feature functions from training data, determining the probability of a given label sequence Y given input sequence X and determining the most likely label sequence Y given input sequence X. It will be appreciated that other machine learning algorithms known in the art such as, but not limited to, Hidden Markov Models (HMM) may be employed to extract the user information from the digital object.

In another embodiment, network builder 106 receives the information from application server 104 via a web form hosted on application server 104. The information received in the web-form may follow a common format. Since, the information is in a structured format, network builder 106 does not necessarily employ the machine learning algorithm.

In an embodiment, extraction module 204 may store the extracted information fields in user information database 108. Further, social network engine 206 may obtain additional information about the user from other sources 110. In an embodiment, social network engine 206 assesses the strength of relationships between the user and a plurality of other users, based on the extracted information of the user. In an embodiment, each of the plurality of other users may be associated with one or more existing social networks.

In an embodiment, social network engine 206 identifies the relationship between the user and the plurality of other users based on one or more common attributes. The one or more common attributes may include, without limitation, users residing in the same locality, users seeking similar jobs, users in the same age group, users expecting similar salaries, users who have worked in the same company, users who have graduated from the same school, users having the same field of specialization, users having complementary fields of specialization, users who have similar skills, and the like. Social network engine 206 searches user information database 108 to identify a plurality of other users who may have common attributes with the user. Social network engine 206 may employ any of the searching techniques known in the art, such as database queries, regular expressions, match reports, machine learning algorithms and so forth.

In one embodiment, social network engine 206 considers other users with complementary user information, to identify relationships of the other users with the user. For example, if the user may be adept at designing web-site front ends, social network engine 206 considers other users adept at designing and managing web-site back ends as related to the user.

Further, social network engine 206 may define one or more parameters to assess the strength of relationships between the user and the plurality of other users. The parameters may include, without limitation, number of common attributes between the user and another user, existing number of users in a particular social network, importance of common attributes between the user and another user, and the like. For example, a user having the same area of residence, same college of graduation and same extra-curricular interests as another user may indicate a relationship with high strength, whereas a user having simply the same area of residence as another user may indicate a relationship with low strength. In another exemplary scenario, the time frame at an organization may have higher importance than the organization name itself, i.e. relationship of a user having worked at Yahoo! between 1998 and 2008 with another user having worked at Yahoo! between 1998 and 2004 may have high strength, whereas the relationship between a user and another user having worked at Yahoo! at separate times, may have low strength. It will be apparent to a person ordinarily skilled in the art that there may be numerous other ways in which the strength of the relationships of the user with the other users can de assessed Social network engine 206 adds the user to one or more existing social networks based on the user information and the strength of the relationship of the user with the plurality of other users. Social network engine 206 searches user information database 108 to identify social networks potentially relevant to the user and adds the user to the identified social networks. Social networks on the social networking service may have an associated tag to identify the relevance of the social network. Social network engine 206 correlates the user information and the tags associated with the social networks to identify social networks relevant to the user.

Social network engine 206 may alternatively create one or more new social networks based on the user information and the strength of the relationship of the user with the plurality of other users. For example, if a number of users sharing certain common attributes, such as same area of residence and playing the same sport, exceeds a predefined threshold, social network engine 206 creates a new social network including such users. The predefined threshold may be set manually or automatically, using any of the known statistical modeling techniques known in the art. Also, if social network engine 206 determines that a user has a large number of strong relationships with the other users, but a social network corresponding to such relationships does not exist, social networking engine 206 may create a social network of users sharing the strong relationships. Social network engine 206 then adds the user to the new social network.

Since social network engine 206 categorizes the users within relevant social networks; various advertisers, recruiters, and other such entities may use the social networking service to identify users for delivering relevant content such as advertisements, job advertisements, event invitations and so forth. In some embodiments, entities seeking users for involvement in causes such as, but not limited to, focus groups, research bodies, musical bands, theater production groups, volunteers for events, subjects for research and studies, and so forth, may use social networking service to shortlist and/or select suitable users. In other embodiments, advertisers may use the social networking service to place targeted advertisements by identifying relevant social networks. In yet other embodiments, recruiters seeking suitable users for filling a job position may also use social networking service. In an embodiment, such entities may require subscribing to the social networking service and may be required to pay for the subscription. The subscription may be a fixed fee based subscription, a pay-per-use subscription, or a commission based subscription. The advertisers may follow pay-per-click, pay-per-view or any other payment models known in the art of online advertising.

In an embodiment, recommendation module 208 utilizes the social networking service for making recommendations to advertisers, recruiters and other such entities.

Recommendation module 208 may recommend social networks to advertisers, recruiters and other similar entities for providing targeted content to the social networks. Recommendation module 208 may recommend one or more social networks based on the relevance of the social network for the entities. For example, recommendation module 208 may recommend the "Stanford Graduate School of Business" social network to RIM® for marketing its Blackberry™ cell phones, or recommend Mercedes-Benz® the "Senior Executives-Investment banking" social network for marketing its S-class automobiles. In another exemplary scenario, recommendation module 208 may recommend the "Java Developers" social network to recruiters seeking candidates for a Senior Java Developer job position.

In an embodiment, recommendation module 208 may recommend social networks to advertisers, recruiters, and other similar entities, based on the activity in the social networks. Recommendation module 208 determines the activity of the social network using factors such as, but not limited to, the number of users that actively interact in the social network, the amount of time that the users spends on the social network, and the like. Social networks with high levels of activity are preferred for placing advertising material, in comparison to social networks with less activity. Recommendation module 208 may use any of the various data logging and data analysis techniques known in the art for determining the activity of the users.

In another embodiment, recommendation module 208 may recommend individual users to advertisers, recruiters and other similar entities based on the activity of the users in the social network. Users that are more active are more likely to convey the targeted advertising content to other users of the social network. The activity of the users include, without limitation, the number of messages posted on the social network service by the user, the number of page views for the user's messages, the amount of time the user spends on the social network service, and the like.

In some embodiments, recommendation module 208 identifies the users having a large number of relationships with the other users. Recommendation module 208 then recommends the highly connected users to advertisers for targeting their advertising content. Such users are more likely to be influential persons in an organization or social network and advertising content targeted to such users is more likely to be conveyed to the other users of the organization or social network. In another embodiment, recommendation module 208 may recommend the highly connected users to the recruiter in preference to other users with similar skills, qualification and work experience.

In one embodiment, recommendation module 208 may also recommend institutions or organizations as future career options to the users, based on the user information. For example, recommendation module 208 identifies the user's current position in a popular career path, using information such as the highest educational degree held by the user and the past and current employers of the user. Recommendation module 208 then recommends the institution preceding the user's current position in the popular career path. The popular career path may be defined by network based service provider 102 using the information stored in user information database 108 and additional information obtained from other sources such as, but not limited to, educational institution rankings obtained from U.S. News and World Report; top employer rankings obtained from Fortune magazine and Forbes magazine; different industries and different positions in an industry obtained from the United States Bureau of Labor Statistics and the like. Recommendation module 208 may also use information such as the area of specialization of the user, the skills of the user and the interests of the user to recommend institutions or organizations as future career options to the user. In one embodiment of resume processing, recommendation module 208 may screen job advertisements and recommend the user only those jobs which are higher than the user's current job position in the career path.

In some embodiments, network based service provider 102 provides targeted content to the users and social networks on behalf of advertisers, recruiters and other similar entities. In such embodiments, recommendation module 208 provides recommendations to a content server of network based service provider 102. Advertisers, recruiters and other similar entities may upload the content they wish to provide, to the users and social networks, on the content server, and the content server may provide the content based on the recommendations provided by recommendation module 208.

As such, the social networks built by social network engine 206 may be readily usable by advertisers, recruiters and other such entities, without requiring post-processing the data such as filtering and/or sorting the user information. Network based service provider 102 may provide access to the information stored in user information database 108 through a separate web interface. Network based service provider 102 may provide access to user information database 108 without sharing any personally identifiable information and adhering to a privacy policy.

Process

Figure 3:
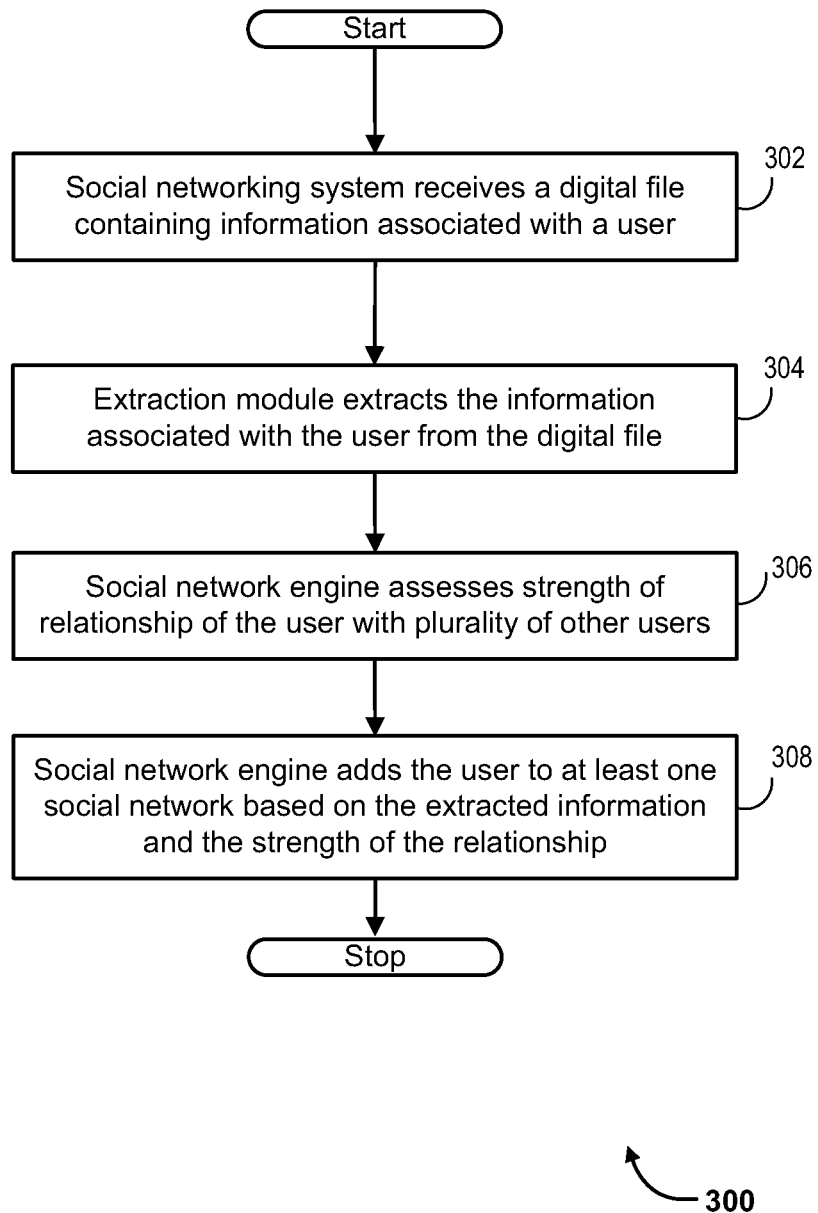
FIG. 3 is a flowchart illustrating an example method for forming a social network according to one embodiment.

FIG. 3 is a flowchart illustrating an exemplary process for adding a user to a social network based on the user information.

At step 302, network based service provider 102 receives a digital object containing information associated with a user. In an embodiment, the digital object may be in an unstructured format or a structured format. The unstructured format refers to the digital object uploaded by the user. The digital object may be, without limitation, a word processor document, a Portable Document Format (PDF) file, a text file, a Hyper-Text Markup Language (HTML) file, a Tagged Image File Format (TIFF) image or a Portable Network Graphics (PNG) image. The structured format refers to the information filled by the user on a web-form provided by network based service provider 102. However, for analyzing the information associated with one user with another user, the information is generally extracted from the digital objects. In an embodiment, the digital object is an electronic version of the user's resume.

At step 304, extraction module 204 extracts the user information from the digital object. In an embodiment, extraction module 204 may use machine learning algorithms in a cascaded two-phase approach to extract the user information. Machine learning algorithms such as, but not limited to, CRFs automate with accuracy the data entry process, which would otherwise require manual effort. Extraction module 204 employs a two-phase approach, since it gives context to the information being extracted and hence provides better accuracy. The cascaded two-phase process is explained in conjunction with FIG. 2. In another embodiment, network builder 106 receives the information from application server 104 via a web form hosted on application server 104. The information received in the web-form may follow a common format. Since, the information is in a structured format, extraction module 204 may not employ the machine learning algorithm.

At step 306, social network engine 206 assesses the strength of relationships between the user and a plurality of other users. In an embodiment, each of the plurality of other users may be associated with one or more existing social networks. The relationship strength is accessed based on the extracted information of the user. Further, social network engine 206 may define one or more parameters to decide the strength of relationship between the user and the plurality of other users. The one or more parameters may include, without limitation, number of common attributes between the user and plurality of other users, existing number of users in a particular social network, importance of common attributes between the user and plurality of other users, and the like.

At step 308, social network engine 206 adds the user in one or more social networks based on the extracted information and the strength of the relationship between the user and plurality of other users. In an embodiment, social network engine 206 may also consider additional information obtained from other sources while adding the user to the one or more social networks. In an embodiment, when social network engine 206 adds the user to the social networks, the user can expand his social networks as per his requirements. In another embodiment, social network engine 206 dynamically updates the social network of the user by adding any additional users, who shares same information as of the user. The social networks may be used for a variety of different purposes such as, but not limited to, providing targeted advertisements, providing targeted job advertisements, and providing career path recommendations to the user, apart from the traditional use of social networks. In an embodiment, recommendation module 208 may provide recommendations to the users, advertisers, recruiters and other such entities.

Figure 4A:
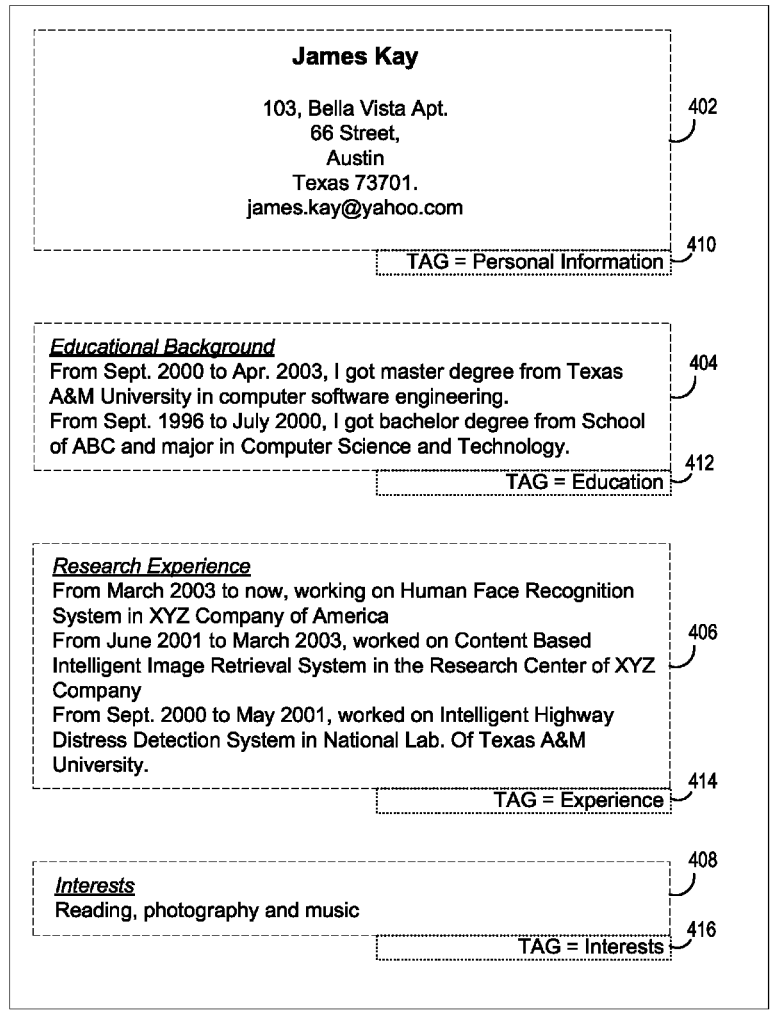
FIG. 4A illustrates an example digital object containing information associated with a user, according to one embodiment.

FIG. 4A illustrates an exemplary digital object 400A containing user information, according to one embodiment. The digital object in this case is a resume uploaded by the user. Network builder 106 needs to extract the information from the digital object in order to analyze the user information with another user. For extracting the information, extraction module 204 employs a two phase machine learning algorithm. In the first phase, extraction module 204 identifies a personal information segment 402, an educational background section 404, a research experience segment 406, and an interests segment 408 in the resume. Extraction module 204 then tags personal information segment 402 with segment label 410 "personal information", educational background section 404 with segment label 412 "education", research experience segment 406 with segment label 414 "experience" and interests segment 408 with segment label 416 "interests".

FIG. 4B illustrates example user information, extracted from the digital object according to one embodiment. The digital object in this case is the user's resume. In the second phase, extraction module 204 extracts one or more information fields from the identified information segments. Extraction module 204 extracts the name, address, city, zip-code and email information fields 418 from personal information segment 402; the graduation school, graduation year, major and degree information fields 420 from educational background section 404; the project, company/university of project and project duration information fields 422 from research experience segment 406; and the interests information fields 424 from interests segment 408 of the resume.

In one embodiment, social network engine 206 uses the user information to add the user to one or more social network. In another embodiment, social network engine 206 may also consider the strength of the relationship between user and plurality of other users to add the user in either one or more existing social networks or creating one or more new social networks. Further, recommendation module 208 may then provide recommendations to the user based on the user's membership to the social networks.

Figure 4C:
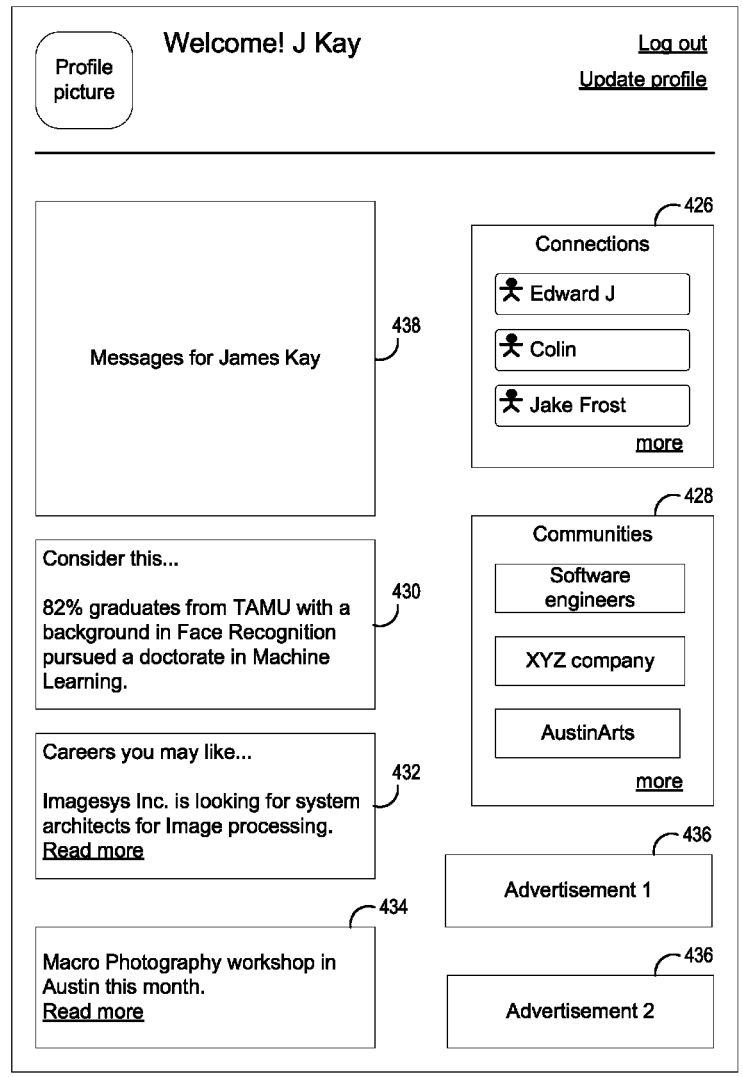
FIG. 4C illustrates an example user profile page according to one embodiment.

FIG. 4C illustrates an example user profile page 400C on the social network service hosted by network based service provider 102 according to one embodiment. The user profile page displays the user's connections 426—i.e., other users with whom the user has social ties. The user profile page also displays one or more social networks 428 such as, the Software Engineers social network, the XYZ Company Employees social network, and AustinArts—the local art and music social network. User profile page 400C displays the recommendations 430 provided by recommendation module 208, such as academic options recommendations. User profile page 400C also displays job advertisements 432 relevant to the user. Further, user profile page 400C displays alerts or upcoming event notifications 434 according to the user's interests and hobbies. User profile page 400C displays advertisements 436 relevant to the user. For example, Advertisement 1 may be served to all members of the AustinArts social network, and Advertisement 2 may be served to the user based on the user information. Apart from the aforementioned information, user profile page 400C also displays messages 438 for the user, from other users, similar to a conventional social networking service.

The invention has been explained with references to specific embodiments. However, other implementation scenarios can be foreseen. One such exemplary implementation includes the use of academic transcripts of the user to build a social network for the user. Extraction module 204 may identify personal information, curricular, projects and extra-curricular activities sections of the academic transcripts. Extraction module 204 may then extract name, roll number and year of enrollment from the personal information segment of the academic transcripts; course names and GPAs from the curricular section; project names and scopes from the projects section; and sports, dramatics, music achievements and the like from the extra-curricular section of the academic transcript. Social network engine 206 may then use the user information to add the user to social networks. Social network engine 206 may obtain additional information from other sources 110 such as, but not limited to, theater group, musical workshops and industry project groups. The social networks may connect the user to peers in the same area of specialization, or assist in forming study groups based on the courses and GPA of the user, recommend extra-curricular events such as music concerts or theater performance based on the user's extra-curricular interests and hobbies, and so forth.

Social Networking System Architecture

Figure 5:
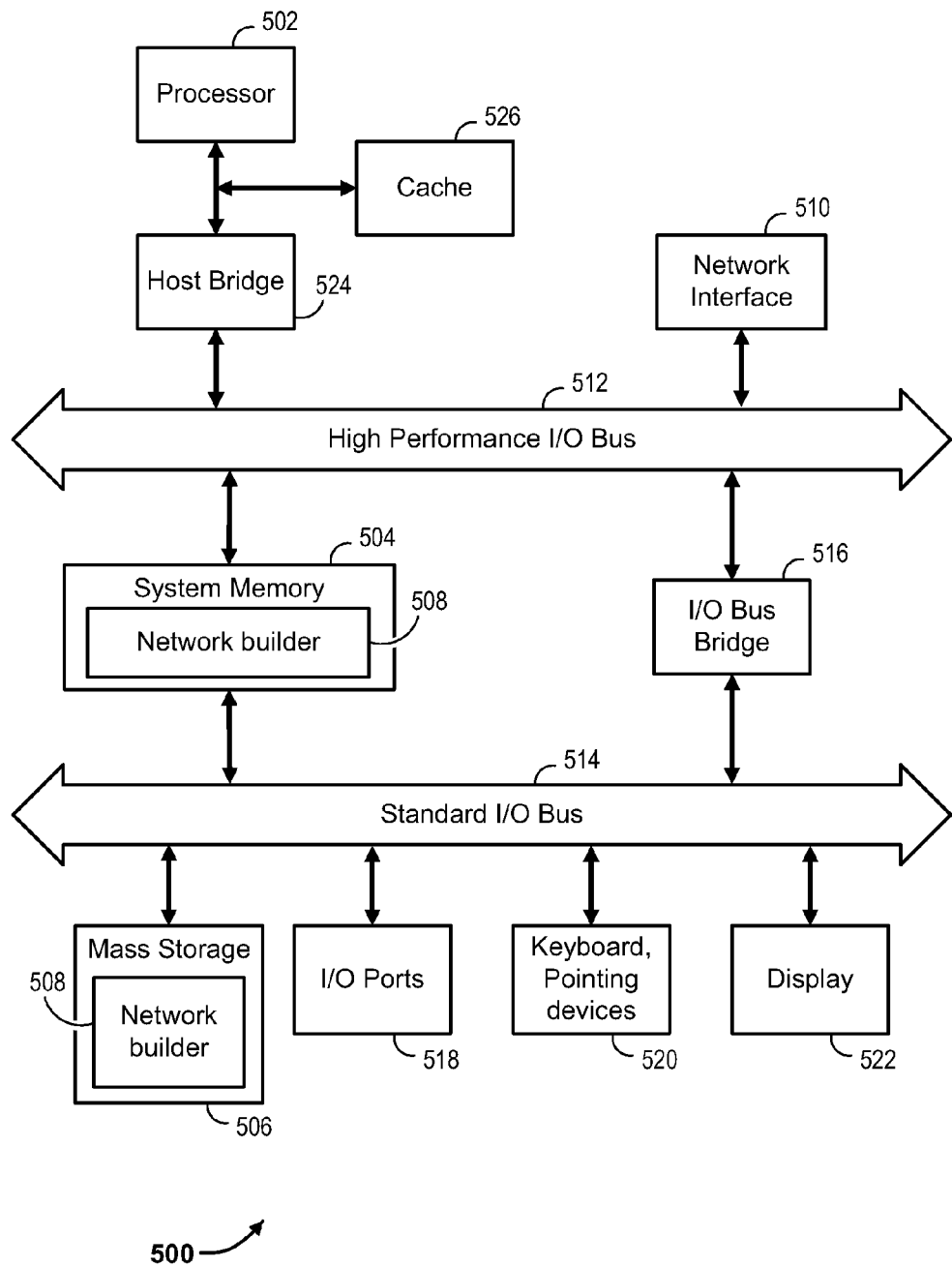
FIG. 5 is a schematic diagram illustrating an example computing system for generating one or more personalized identifiers according to one embodiment.

FIG. 5 illustrates an example hardware system 500 to implement network builder 106 according to one embodiment. Hardware system 500 includes at least one processor 502, a system memory 504, and mass storage 506. The system memory 504 has stored therein one or more application software, programming instructions for implementing social network builder 508, an operating system and drivers directed to the functions described herein. Mass storage 506 provides permanent storage for the data and programming instructions for social network builder 508, whereas system memory 504 (e.g., DRAM) provides temporary storage for the data and programming instructions when executed by processor 502. The process flow of the programming instructions for social network builder 508 is described in detail in conjunction with FIG. 3. In on embodiment, user information database 108 may reside in mass storage 506. A network/communication interface 510 provides communication between hardware system 500 and any of a wide range of networks, such as an Ethernet (e.g., IEEE 802.3) network, etc. Additionally, hardware system 500 includes a high performance input/output (I/O) bus 512 and a standard I/O bus 514. System memory 504 and network/communication interface 510 couple to bus 512. Mass storage 506 couple to bus 514. I/O Bus Bridge 516 couples the two buses 512 and 514 to each other.

In one embodiment, social network building process 300 described herein is implemented as a series of software routines run by hardware system 500. These software routines comprise a plurality or series of instructions to be executed by a processor in a hardware system, such as processor 502. Initially, the series of instructions are stored on a storage device, such as mass storage 506. However, the series of instructions can be stored on any suitable storage medium, such as a diskette, CD-ROM, ROM, EEPROM, DVD, Blu-ray disk, etc. Furthermore, the series of instructions need not be stored locally, and could be received from a remote storage device, such as server on a network, via network/communication interface 510. The instructions are copied from the storage device, such as mass storage 506, into system memory 504 and then accessed and executed by processor 502.

In one embodiment, hardware system 500 may also include I/O ports 518, a keyboard and pointing device 520, a display 522 coupled to bus 512. I/O ports 518 are one or more serial and/or parallel communication ports that provide communication between additional peripheral devices, which may be coupled to hardware system 500. A host bridge 524 couples processor 502 to high performance I/O bus 510. Hardware system 500 may further include video memory (not shown) and a display device coupled to the video memory. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

Hardware system 500 may include a variety of system architectures; and various components of hardware system 500 may be rearranged. For example, cache 526 may be on-chip with processor 502. Alternatively, cache 526 and processor 502 may be packed together as a "processor module," with processor 502 being referred to as the "processor core." Furthermore, certain embodiments of the present invention may not require nor include all of the above components. For example, the peripheral devices shown coupled to standard I/O bus 512 may couple to high performance I/O bus 510. In addition, in some embodiments only a single bus may exist with the components of hardware system 500 being coupled to the single bus. Furthermore, hardware system 500 may include additional components, such as additional processors, storage devices, or memories.

An operating system manages and controls the operation of hardware system 500, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Server operating system, available from Microsoft Corporation of Redmond, Wash., the Apple Macintosh Operating System, available from Apple Computer Int. of Cupertino, Calif., UNIX operating systems, and the like.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

The invention claimed is:

1. A method comprising:
   receiving, by a processor, at a server, a digital object, wherein the digital object comprises information associated with a user;
   extracting, by the processor, the information associated with the user from the received digital object by identifying a plurality of information segments in the received digital object; and
   extracting one or more information fields from the plurality of information segments;
   assessing, by the processor, based on the extracted information, strength of relationships between the user and a plurality of other users, each associated with one or more social networks, the strength of the relationships between the user and the plurality of other users is based on number of common attributes between the user and plurality of other users and importance of the common attributes between the user and plurality of other users as obtained from the extracted information; and
   adding, by the processor, the user to at least one social network based, at least in part, on the information associated with the user and the strength of the relationships between the user and a plurality of other users.

2. The method of claim 1 further comprising obtaining additional information from one or more other sources, wherein the additional information comprises one or more of additional information associated with the user, demographic information and statistical information.

3. The method of claim 1 further comprising providing relevant content to the user based at least in part on membership of the user to the at least one social network.

4. The method of claim 1 further comprising recommending one or more institutions to the user based, at least in part, on the information associated with the user.

5. The method of claim 1, wherein the digital object is one of a text file, a word processor document, a portable document format document, and a scanned image.

6. The method of claim 1, wherein the strength of relationship is based further on existing number of users in a particular social network.

7. The method of claim 1, wherein the plurality of information segments comprise one or more of personal information, educational qualification of the user, work experience of the user, skills of the user, objectives of the user and references of the user.

8. The method of claim 1, wherein the one or more information fields comprise one or more of name, residential address, phone number, age, gender, languages known, graduation school name, degree, specialization, employer information, job designation, job profile, career objectives, expected salary and references.

9. The method of claim 1, wherein adding the user to at least one social network further comprises:
   identifying, by the processor, relevance tags associated with each of a plurality of social networks, wherein the at least one social network comprises a plurality of social networks;
   correlating, by the processor, the relevance tags with the extracted information associated with the user.

10. A system for processing information, the system comprising:
    one or more network interfaces; at least one processor;
    a memory; and computer program code stored in a computer readable storage medium, wherein the computer program code, when executed, is operative to cause the at least one processor to:

receive, at a server, a digital object, wherein the digital object comprises information associated with a user;

extract the information associated with the user from the received digital object by identifying a plurality of information segments in the received digital object; and extracting one or more information fields from the plurality of information segments;

assess, based on the extracted information, strength of relationships between the user and a plurality of other users, each associated with one or more social networks, the strength of the relationships between the user and the plurality of other users is based on number of common attributes between the user and plurality of other users and importance of the common attributes between the user and plurality of other users as obtained from the extracted information; and add the user to at least one social network based, at least in part, on the information associated with the user and the strength of the relationships between the user and a plurality of other users.

11. The system of claim 10, wherein the computer program code is further operative to cause the at least one processor to obtain additional information from one or more other sources, wherein the additional information comprises one or more of additional information associated with the user, demographic information and statistical information.

12. The system of claim 10, wherein the computer program code is further operative to cause the at least one processor to provide targeted advertisements to the user based on membership of the user to the at least one social network.

13. The system of claim 10, wherein the computer program code is further operative to cause the at least one processor to recommend institutions to the user based, at least in part, on the information associated with the user.

14. The system of claim 10, wherein the digital object is one of a text file, a word processor document, a portable document format document, and a scanned image.

15. A computer program product comprising a computer readable medium encoded with computer-executable instructions for processing information, the computer-executable instructions, when executed, cause one or more processors to:

receive, at a server, a digital object, wherein the digital object comprises information associated with a user;

extract the information associated with the user from the received digital object by identifying a plurality of information segments in the received digital object; and extracting one or more information fields from the plurality of information segments;

assess, based on the extracted information, strength of relationships between the user and a plurality of other users, each associated with one or more social networks, the strength of the relationships between the user and the plurality of other users is based on number of common attributes between the user and plurality of other users and importance of the common attributes between the user and plurality of other users as obtained from the extracted information; and add the user to at least one social network based, at least in part, on the information associated with the user and the strength of the relationships between the user and a plurality of other users.

16. The computer program product of claim 15 further comprising computer-executable instructions operable to cause the one or more processors to obtain additional information from one or more other sources, wherein the additional information comprises one or more of additional information associated with the user, demographic information and statistical information.

17. The computer program product of claim 15 further comprising computer-executable instructions operable to cause the one or more processors to provide relevant content to the user based at least in part on membership of the user to the at least one social network.

18. The computer program product of claim 15 further comprising computer-executable instructions operable to cause the one or more processors to recommend the at least one social network to one or more organizations for providing advertisements.

19. The computer program product of claim 15 further comprising computer-executable instructions operable to cause the one or more processors to recommend one or more institutions to the user based, at least in part, on the information associated with the user.

* * * * *